(12) United States Patent (10) Patent No.: US 6,754,213 B2
Yang (45) Date of Patent: Jun. 22, 2004

(54) FLEXIBLE AND HIGH-SPEED NETWORK PACKET CLASSIFYING METHOD

(75) Inventor: Ru Lin Yang, Taipei (TW)

(73) Assignee: Institute for Information Industry, Taipei (TW)

( * ) Notice: Subject to any disclaimer, the term of this patent is extended or adjusted under 35 U.S.C. 154(b) by 242 days.

(21) Appl. No.: 10/026,649

(22) Filed: Dec. 27, 2001

(65) Prior Publication Data

US 2003/0123386 A1 Jul. 3, 2003

(51) Int. Cl.[7] .............................................. H04L 12/28
(52) U.S. Cl. ..................................... 370/389; 370/392
(58) Field of Search ................................. 370/389, 390, 370/400–408, 392, 351, 466, 468, 467; 709/230, 238, 235, 245, 246, 249

(56) References Cited

U.S. PATENT DOCUMENTS 6,341,130 B1 * 1/2002 Lakshman et al. .......... 370/389
6,449,256 B1 * 9/2002 Varghese et al. ............ 370/238
6,567,408 B1 * 5/2003 Li et al. ................. 370/395.31

OTHER PUBLICATIONS

Gupta et al, Packet Classification on Multiple Fields, SIG-COMM, pp. 147–160, 1999.*

* cited by examiner

*Primary Examiner*—Frank Duong
(74) *Attorney, Agent, or Firm*—Bacon & Thomas, PLLC (57) ABSTRACT

A flexible and high-speed network packet classifying method is disclosed. A plurality of aggregated flows (Aflows) are defined, each corresponding to an Aflow ID and described by symbols in fields of headers of a plurality of network packets. The tokens of the fields of the headers of the plurality of network packets are extracted. A bit stream pool of a memory is indexed responsive to the token of the field by using a two-stage index manager, wherein the bit stream pool has a plurality of bit streams, each having a plurality of bits arranged serially, and each bit corresponds to an aggregated flow. A bits-and operation is performed for a plurality of bit streams obtained from the bit stream pool for classifying network packets.

10 Claims, 14 Drawing Sheets

FLEXIBLE AND HIGH-SPEED NETWORK PACKET CLASSIFYING METHOD

BACKGROUND OF THE INVENTION

1. Field of the Invention

The present relates to the field of network packet classification, and more particularly, to a flexible and high-speed network packet classifying method.

2. Description of Prior Art

Figure 1:
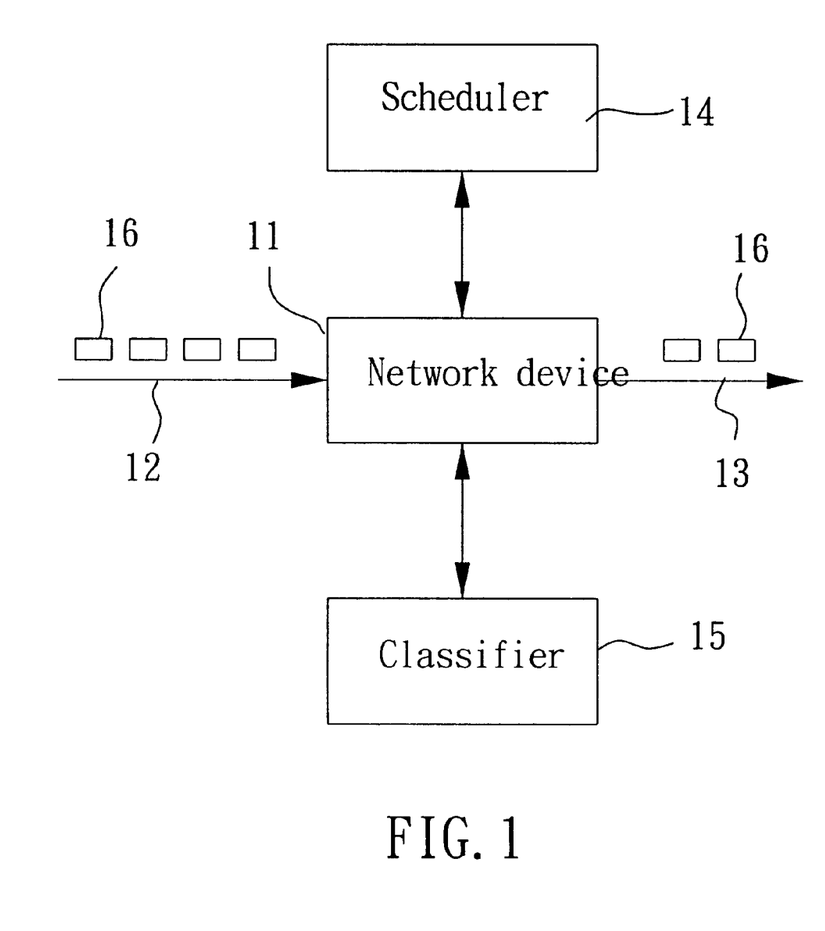
FIG. 1 is a schematic view showing the conventional network packets are transferred through a network device.

The current packet switching network is formed by a plurality of network devices and communication links for connecting the network devices. Information in a form of packet is transferred from a start terminal to a destination terminal through processing of a network device and the transformation of communication devices. Referring to FIG. 1, since the bandwidth of the input link 12 is not identical to that of the output link 13. When the bandwidth of the input link 12 is higher than that of the output link 13, it represents that in a certain time, the number of packets 16 entering into the input link 12 is more than that leaving away from the output link 13. Therefore, a scheduler 14 is equipped in the network device for scheduling the order of processing and outputting packets. The scheduler 14 provides the scheduling service according to the classification of a network packet classifier 15 to the packets.

With the variations of applications of a computer network, some time-limited applications, such as electronic commerce or voice over IP network (VoIP), are more and more popular. In these network applications, the transformation of the packets must be completed in a predetermined time. Therefore, some network devices, such as switches or routers, must transfer packets instantly. Therefore, there is an eager demand for transferring packets in a network device as quickly as possible and classifying the packets in time.

SUMMARY OF THE INVENTION

Accordingly, the object of the present invention is to provide a flexible and high-speed network packet classifying method.

To achieve this object, the present invention provides a flexible and high-speed network packet classifying method comprising the steps of: (A) defining a plurality of aggregated flows (Aflows), each corresponding to an Aflow ID and described by symbols in fields of headers of a plurality of network packets, wherein a symbol is defined as a description of each field, and each symbol corresponds to a specific ID; (B) extracting tokens of the fields of the headers of the plurality of network packets, wherein a token represents an actual value of a field; (C) indexing a bit stream pool of a memory responsive to the token of the field by using a two-stage index manager, wherein the bit stream pool has a plurality of bit streams, each having a plurality of bits arranged serially, and each bit corresponds to an aggregated flow; and (D) performing a bits-and operation for a plurality of bit streams obtained from the bit stream pool for classifying network packets.

The various objects and advantages of the present invention will be more readily understood from the following detailed description when read in conjunction with the appended drawing.

DETAILED DESCRIPTION OF THE PREFERRED EMBODIMENT

Figure 2:
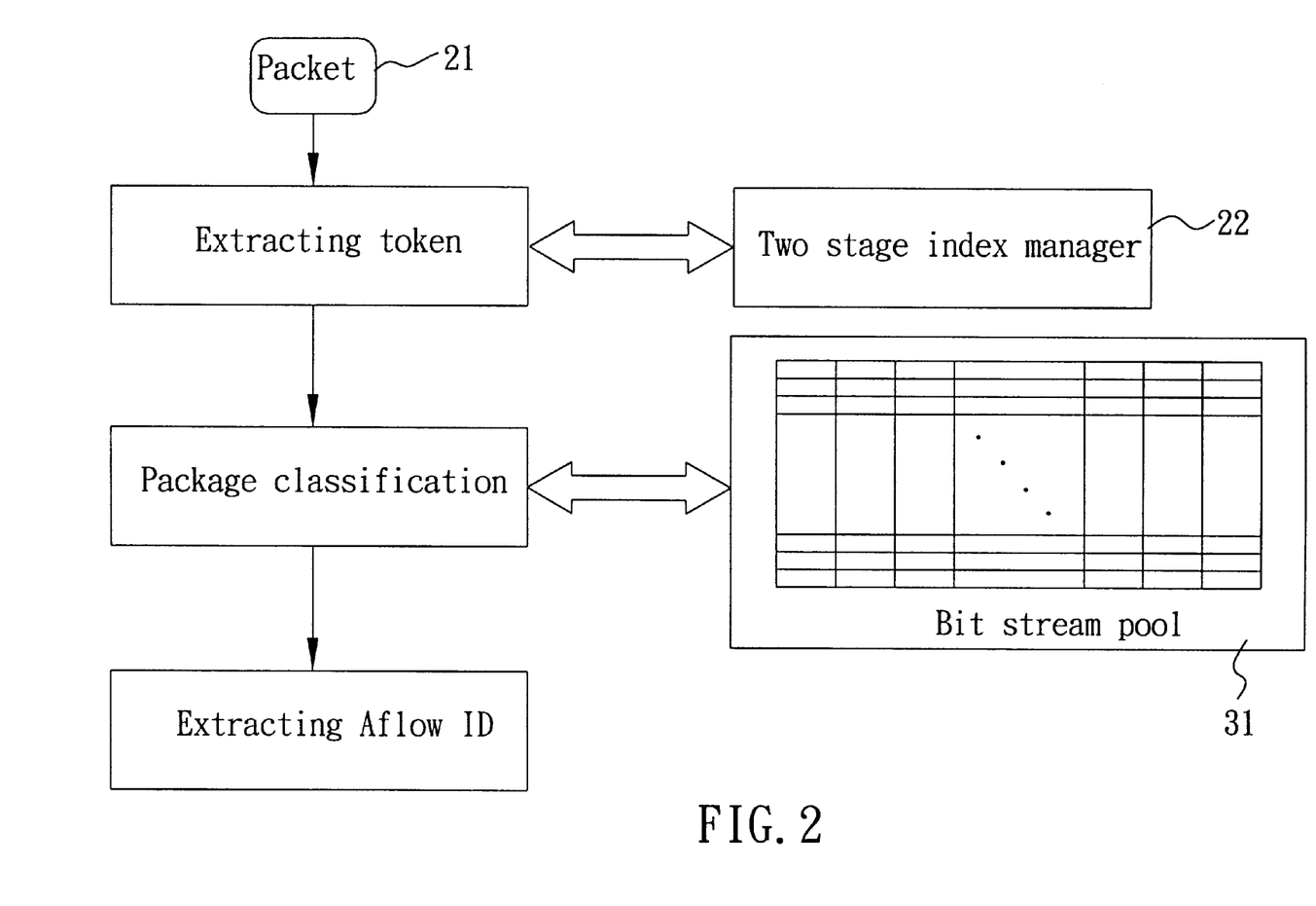
FIG. 2 is a schematic view showing the flow of classification in the present invention.

Referring to FIG. 2, there is shown a classification flow diagram of the present high-speed network packet classifying method. The classification is performed based on the tokens (representing the actual value of a field) of the fields provided by the header of the packet 21, wherein each field has a description referred to as a symbol, and each symbol corresponds to a specific ID. Taking an Ethernet packet as an example, the header of a packet is composed of the following fields:

Destination MAC address (6 byte),
Source MAC address (6 bytes),
TOS/DSCP (1 bytes),
Protocol (1 byte),
Source IP (4 bytes),
Destination IP (4 bytes),
Source Port (2 bytes),
Destination Port (2 bytes), and
Other fields.

In this preferred embodiment, for illustrative purpose, the classification method is executed by extracting the tokens of above eight fields. The tokens obtained from the above fields are indexed by a two-stage index manager 22 based on the aggregated flows (Aflows) preset by system, so as to realize the packet classification. Each aggregated flow corresponds to an aggregated flow ID (Aflow ID), wherein one aggregated flow is considered to be described by the symbols of the plurality of fields. For example, an aggregated flow can be formed by following description:

Destination MAC address is a Wildcard,
Source MAC address is a Wildcard,
TOS/DSCP is a Wildcard, Protocol is a Wildcard, Source IP is 140.92.61.93 or 140.92.62.151 or 140.92.63.10-100, Destination IP is any IP other than x.x.x.55, Source Port is a Wildcard, and Destination Port is a Wildcard.

Figure 3:
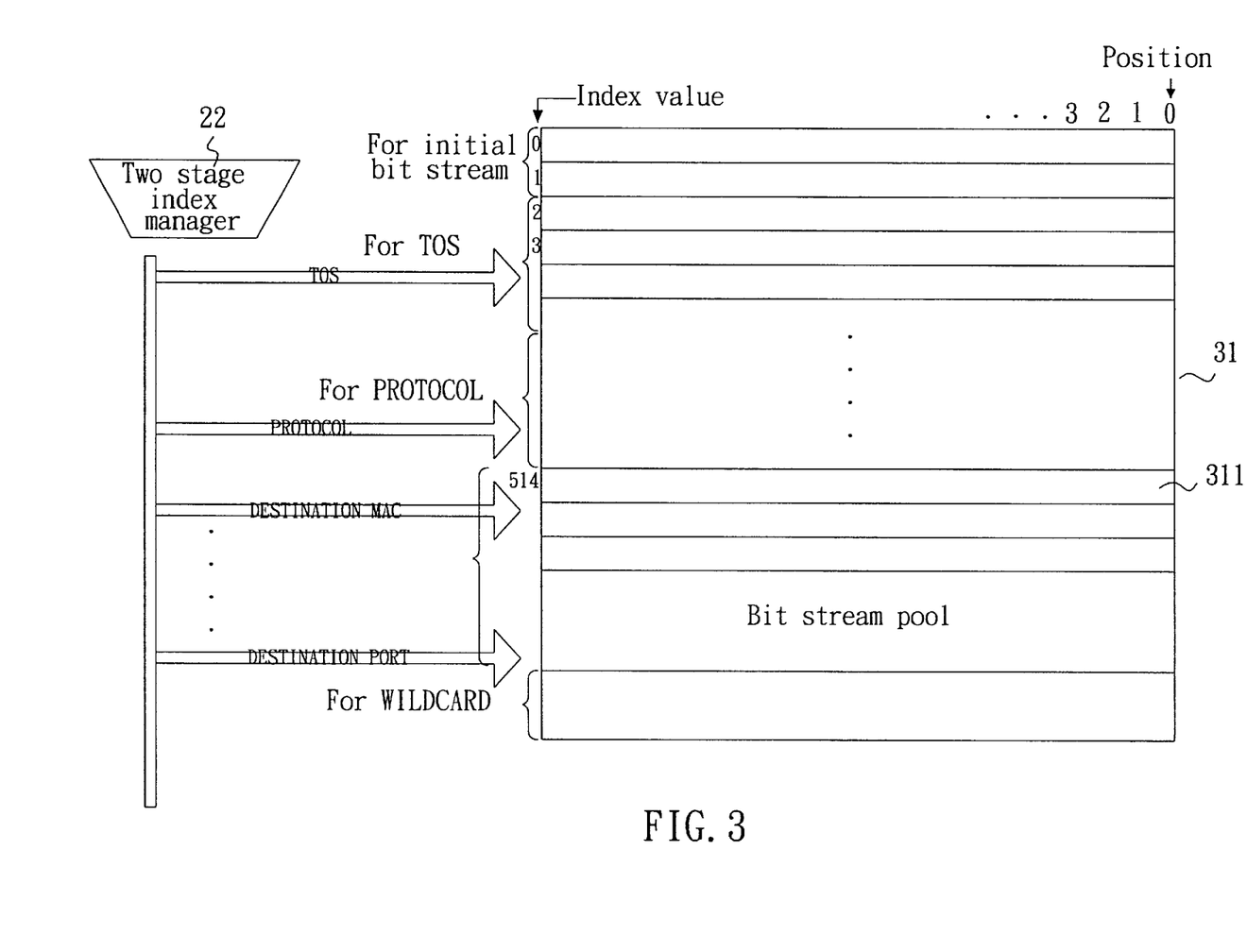
FIG. 3 is a schematic view showing that a bit stream pool is used in the classifying process.

Also referring to FIG. 3, the two-stage index manager 22 is provided to index the bit stream pool 31 of a memory based on the token of the field. The bit stream pool 31 includes a plurality of bit streams 311. Each bit stream 311 has a plurality of bits (for example, 256 bits) serially arranged. A specific bit stream 311 can be accessed by an index. Each of the bits corresponds to an aggregated flow. For example, a bit of 1 in position n of a bit stream represents that the packet conforms to the aggregated flow of AFlow ID=n.

The two-stage index manager 22 generates an index based on the token of a field. If the number of bytes of a field is larger than 1, the required index is generated by a two stage process. Otherwise, only one stage process can be utilized to generate indexes.

Figure 4:
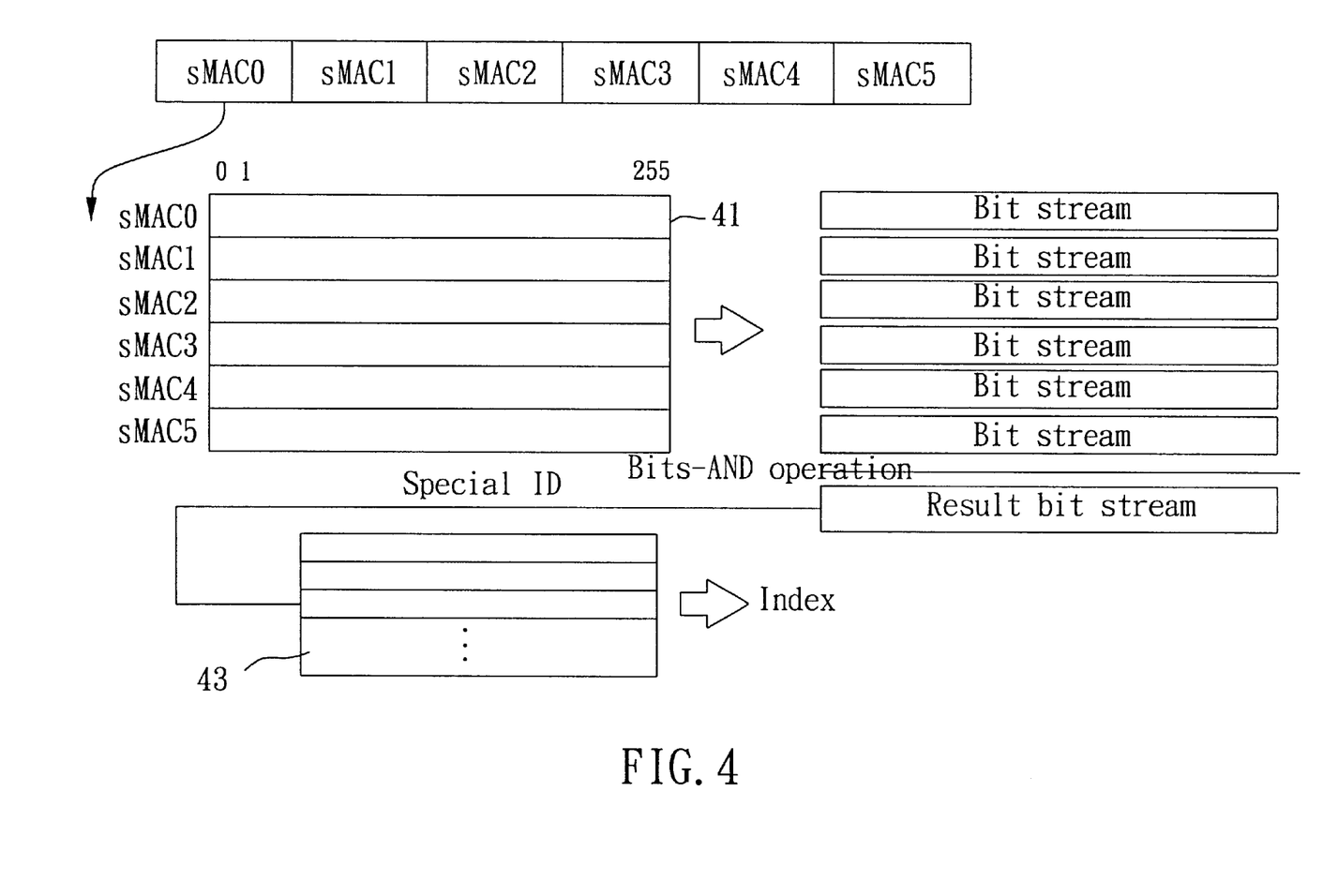
FIG. 4 is a schematic view showing the processing flow diagram of the two dimensional transpose array of the present invention.

Referring to the source MAC address field as an example, as shown in the FIG. 4, the field has six bytes, sMAC0~5. Therefore, a two-stage process is necessary. In the first stage, the content of each byte sMAC is converted into a bit stream through a corresponding bit stream item of a two dimensional transpose array 41. For example, if the value of bit stream sMAC0 is 0x01, the bit stream with row address of 0 and column address of 1 in the two dimensional transpose array 41 is taken out. The bit streams of the bytes corresponding to all source MAC address fields are bits-AND-ed to generate a result bit stream 42, from which the specific ID of the symbol of the source MAC address field is generated. By using this specific ID as an index, the index of this source MAC address field in the bit stream pool can be found from the index table 43 stored with the index values of the bit stream pool.

Similarly, for other field with a plurality of bytes, based on the bytes of a field, the content of each byte is converted into a bit stream through a corresponding item of a two dimensional array. All the bit streams of the field are bits-AND-ed to generate a result bit stream from which a specific ID of this field is generated. By using the specific ID as an index, an index of this field in the bit stream pool can be found from a table stored with bit stream pool index values. In the second stage of this process, as shown in the FIG. 3, the corresponding bit stream is acquired from the bit stream pool 31 based on the index of the field.

Referring to the protocol field as an example, this field only has a byte, and therefore, only one stage of process is required. That is, the token of this field is converted directly to index so as to find a corresponding bit stream from the bit stream pool 31. Similarly, for the other field having only one byte, the token of the field is converted directly into an index so as to find a corresponding bit stream.

Figure 5:
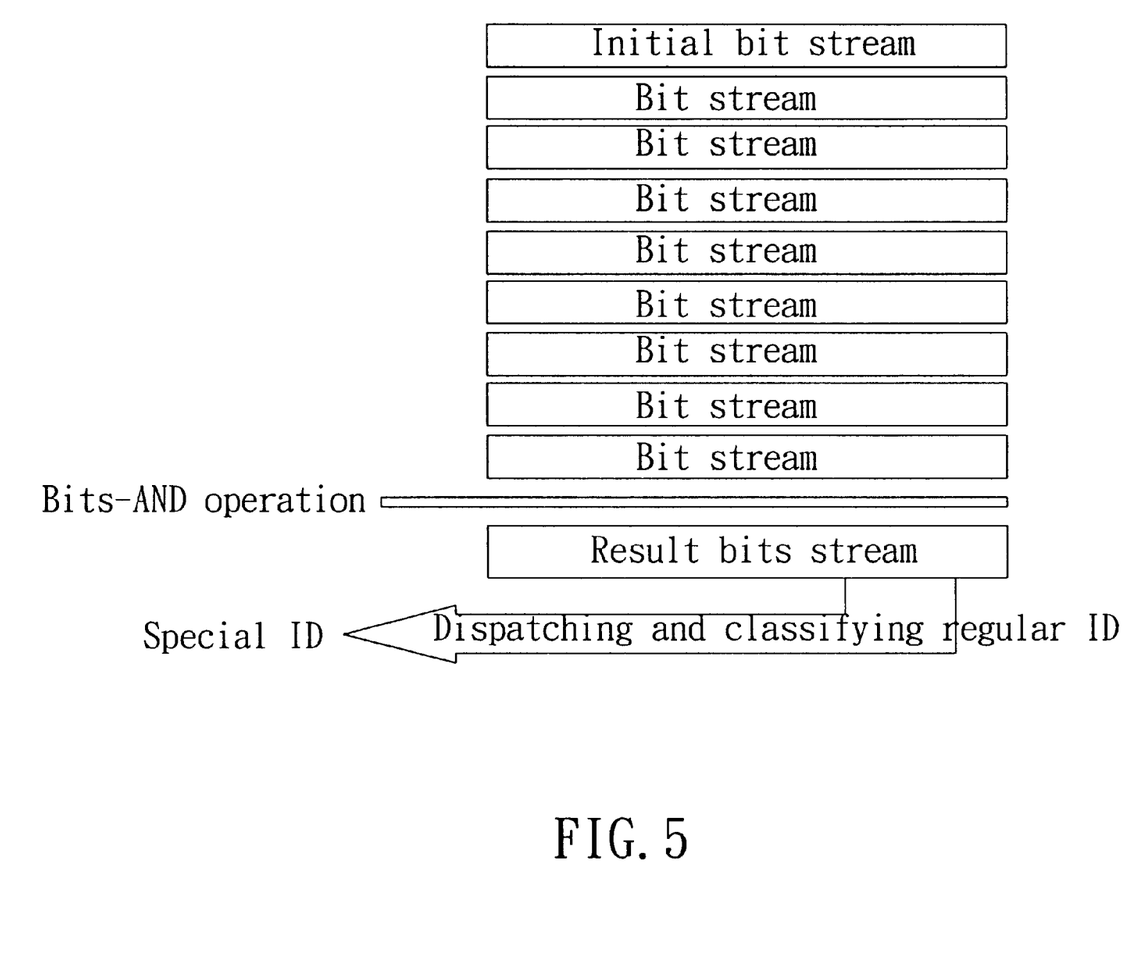
FIG. 5 is a schematic view showing that a bit stream is used to acquire a classification ID (Aflow ID).

With reference to FIG. 5, the bit streams taken out from all the fields are bits-AND-ed to generate a result bit stream 51. A corresponding classification ID is generated from this result bits stream through a method of distributing and classifying regular ID.

Figure 6:
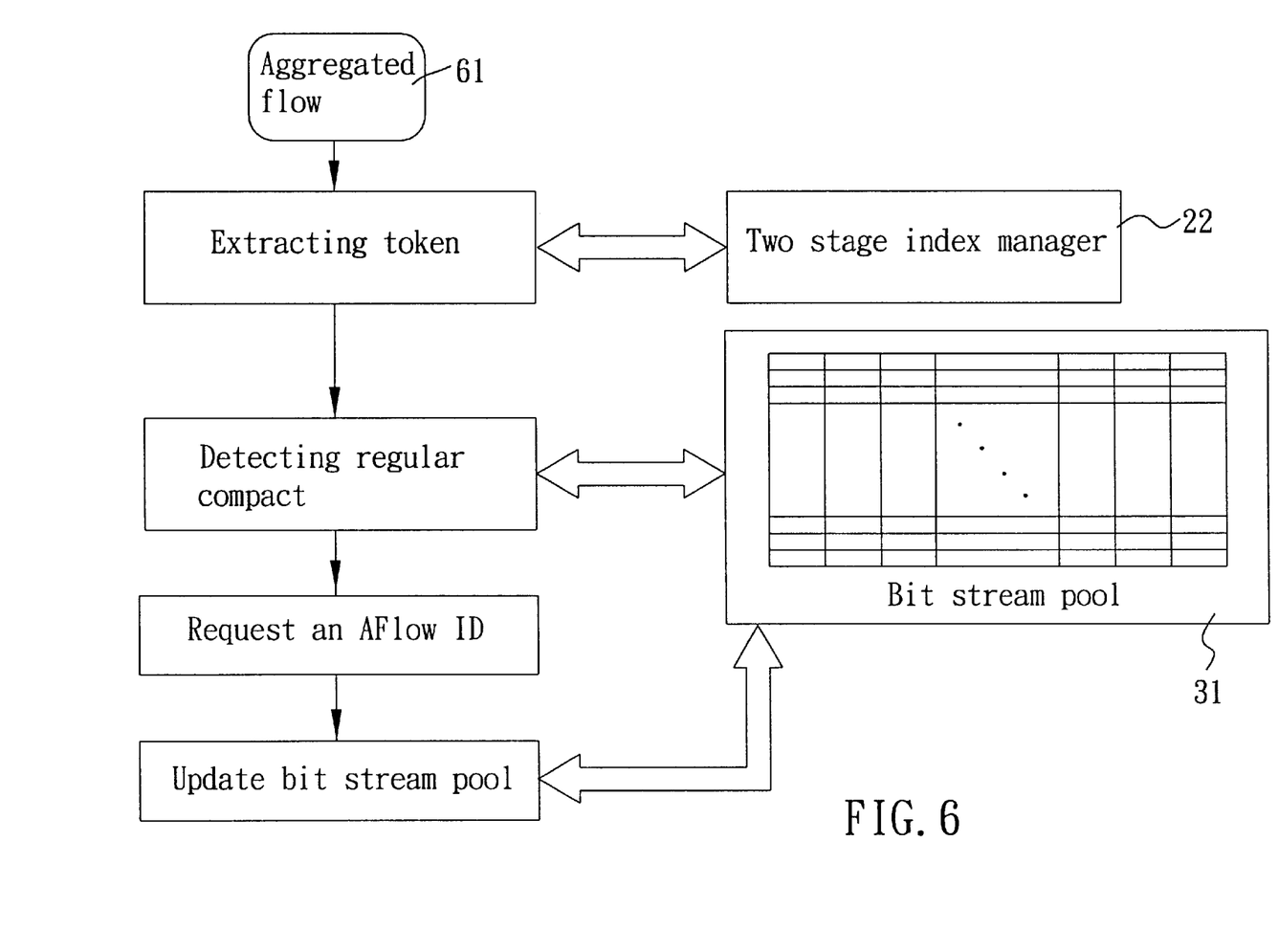
FIG. 6 is a flow diagram for adding a new aggregated flow.

After initializing the system, a new aggregated flow has to be set for classifying packets. A flow diagram of adding a new aggregated flow is illustrated in FIG. 6. It is assumed that the symbols of a new added aggregated flow 61 is extracted as the following:

Destination MAC address is a Wildcard,

Source MAC address is a Wildcard,

TOS/DSCP is a Wildcard,

Protocol is a Wildcard,

Source IP is 140.92.61.93 or 140.92.62.151 or 140.92.63.10-100,

Destination IP is a Wildcard,

Source Port is a Wildcard, and

Destination Port is a Wildcard.

Furthermore, it is assumed that this aggregated flow is a first aggregated flow defined in the system and has an Aflow ID of 0. With reference to FIG. 6, for the Destination MAC address, it has a symbol of wildcard. Therefore, it is only necessary to set the position 0 of the corresponding bit stream used for wildcard in the bit stream pool 31 to 1. For the other field with a symbol of wildcard, the same process is used to set the bit of the position 0 of the corresponding bit stream.

Figure 7:
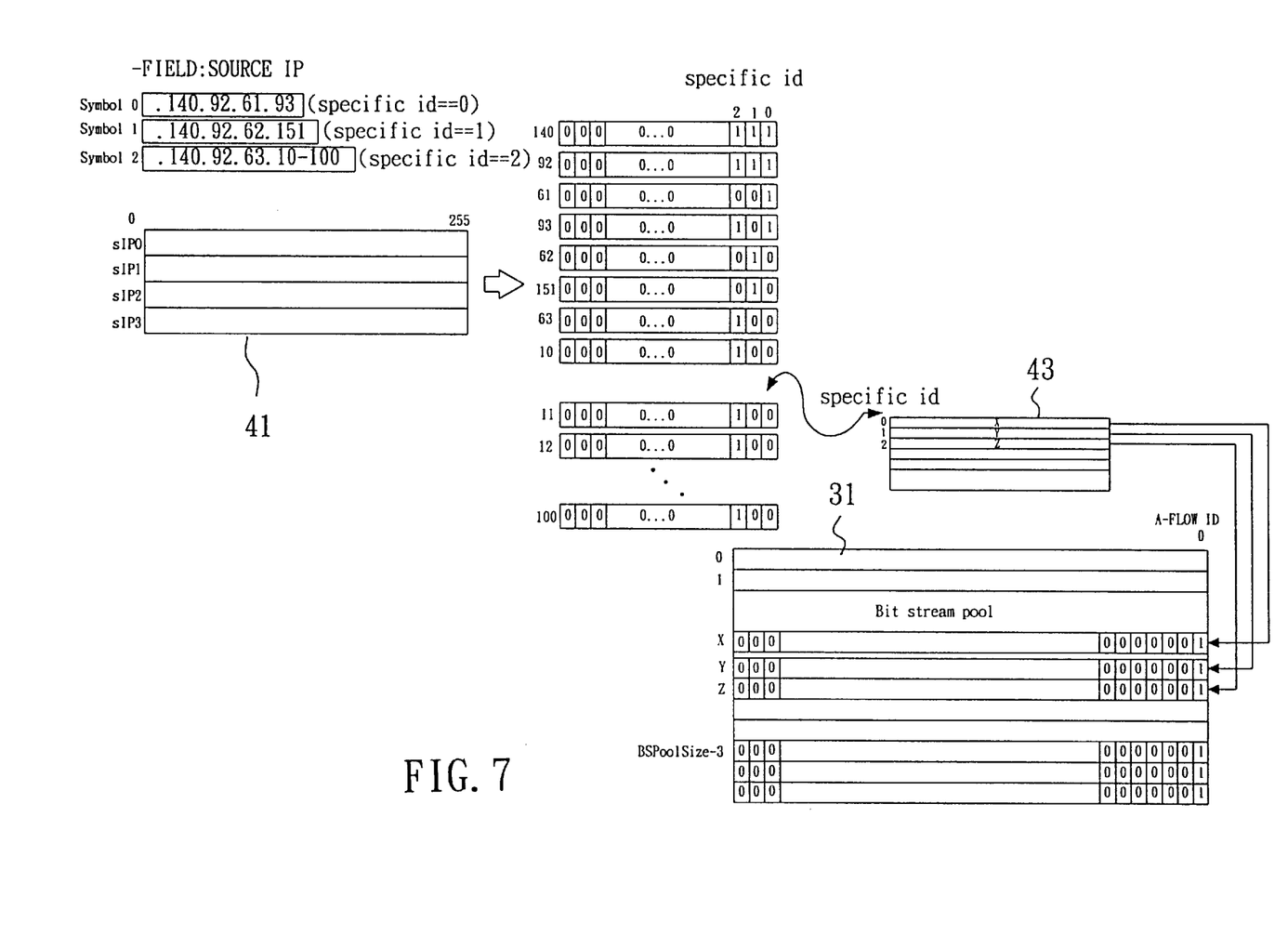
FIG. 7 shows an example of a new added Aflow.

For the field of Source IP, also referring to FIG. 7, it has three symbols in which symbol 0 is 140.92.61.93, symbol 1 is 140.92.62.151, and symbol 2 is 140.92.63.10-100. The specific IDs for the symbols 0, 1 and 2 are 0, 1 and 2. As to the symbol 0, the content of the byte 0 is 140. Therefore, for the bit stream at position (0, 140) of the transpose array 41, the bit at position 0 is set to 1 (since the specific ID=0). The content of the byte 1 of the symbol 0 is 92. Therefore, for the bit stream at position (1, 92) of the transpose array 41, the bit at position 0 is set to 1. The content of the byte 2 of the symbol 0 is 61. Therefore, for the bit stream at position (2, 61) of the transpose array 41, the bit at position 0 is set to 1. The content of the byte 3 of the symbol 0 is 93. Therefore, for the bit stream at position (3, 93) of the transpose array 41, the bit at position 0 is set to 1. Similarly, for the symbol 1 and symbol 2, the same process is used to set the corresponding bit stream of the transpose array 41 so as to generate the index table stored with the bit stream pool index values and determine the contents of the bit streams of the bit stream pool 31, thereby adding new aggregated flows.

Figure 8:
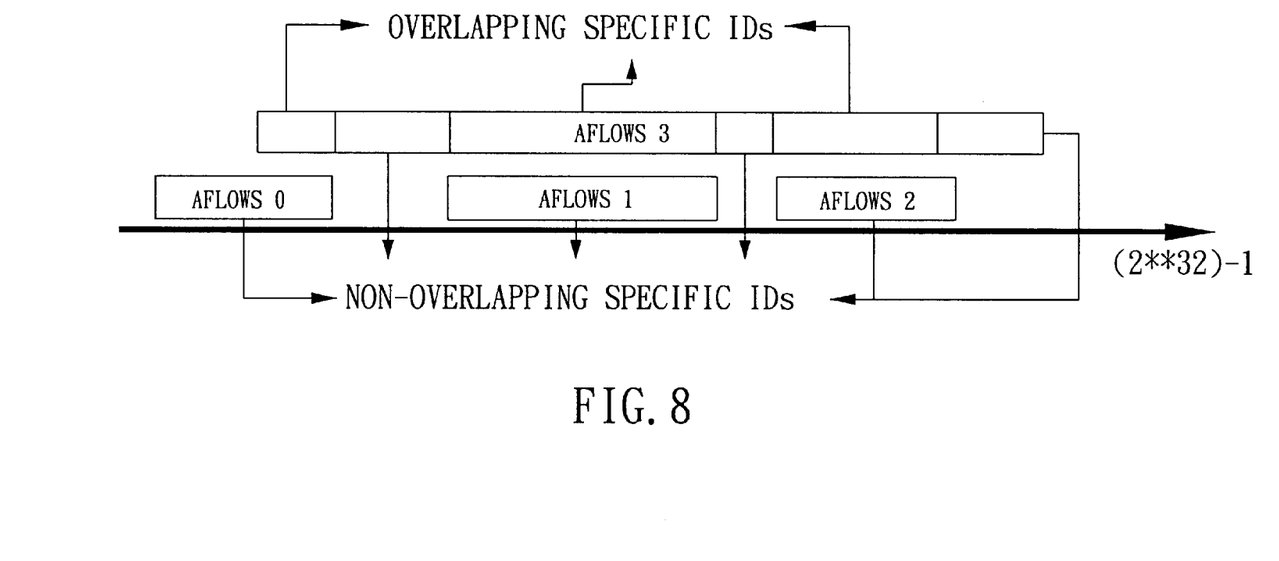
FIG. 8 shows the overlapping of a new added Aflow and an existed aggregated flow.

To achieve the object of rapid classification of packets, the system must manage specific IDs and Aflow IDs. For the management of specific ID, when a new aggregated flow is added, it is possible that there is an overlapping between the range of the new added aggregated flow and the current aggregated flows. and thus it is necessary to be managed. Referring to FIG. 8, when an Aflow 3 is necessary to be added, taking the source IP field thereof as an example, this field has four bytes to provide a range from $0$~$2^{32}-1$. There are overlapping and non-overlapping between this new added Aflow3 and the existing Aflow0, Aflow1,Aflow2. Therefore, it is necessary to cut the range of Aflow3 into overlapping and non-overlapping subsections, each being given a respective overlapping or non-overlapping specific ID.

Figure 9:
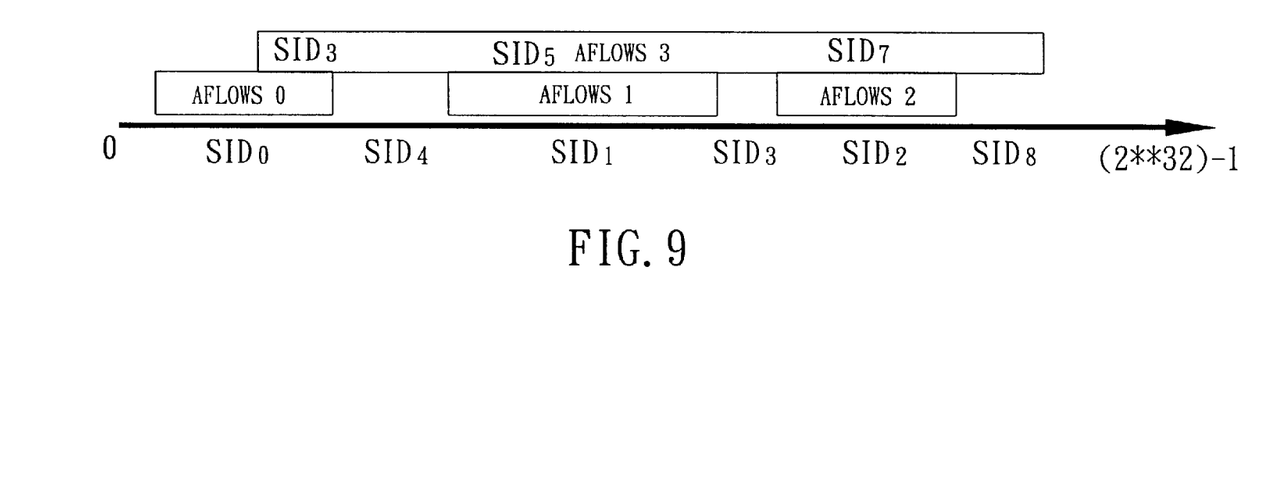
FIG. 9 is a schematic view showing the dispatching of the specific IDs of new added Aflows.

Referring to FIG. 9, the specific IDs of the current Aflow0~2 are SID0, SID1, and SID2. The cut Aflow3 includes the specific IDs of SID3~SID8. The range of SID3 is overlapped with that of the SID0. The range of SID5 is overlapped with that of the SID1. The range of SID7 is overlapped with that of the SID2. The ranges of SID4, SID6 and SID8 are not overlapped. For the overlapped specific IDs, the specific ID of the new added Aflow must be large than the specific IDs of the existing Aflows. Therefore, it obtains: SID3>SID0, SID5>SID1, and SID7>SID2.

Figure 10:
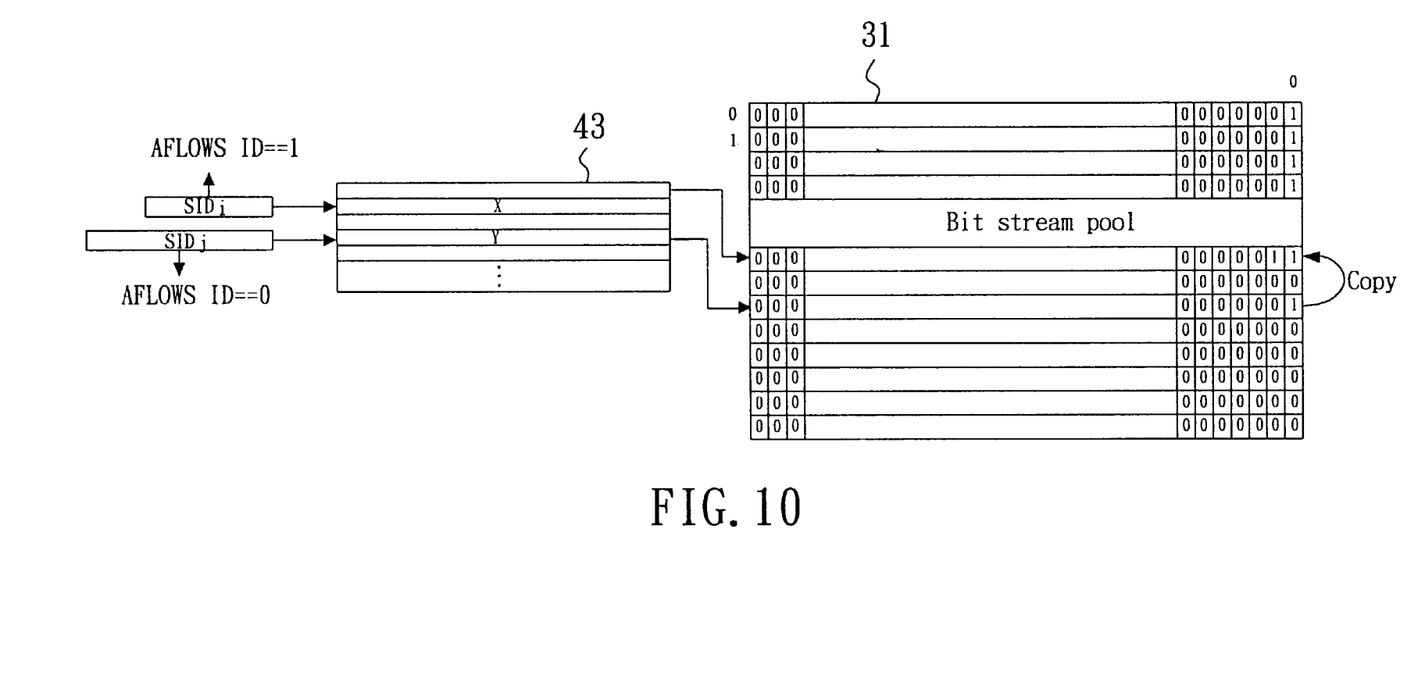
FIG. 10 is a schematic view showing the management of the specific IDs when adding a new aggregated flow.

Thus, it is assumed that the specific ID of the new added Aflow is SIDi, and if it is overlapped with SIDj, SIDj is the maximum specific ID whose range contains the range of SIDi. Referring to FIG. 10, it is assumed that the Aflow ID of a new added Aflow is 1 and the Aflow ID of an existing Aflow overlapped therewith is 0. The index of the SIDj of the existing Aflow in the bit stream pool 31 is y. An unused bit stream is found from the bit stream pool 31, which is assumed to have an index of x and is assigned to the symbol of the SIDi. The bit stream with an index of y is copied to the bit stream with an index of x and the Aflow ID of the new added Aflow is recorded to the bit stream with an index of x.

Figure 11:
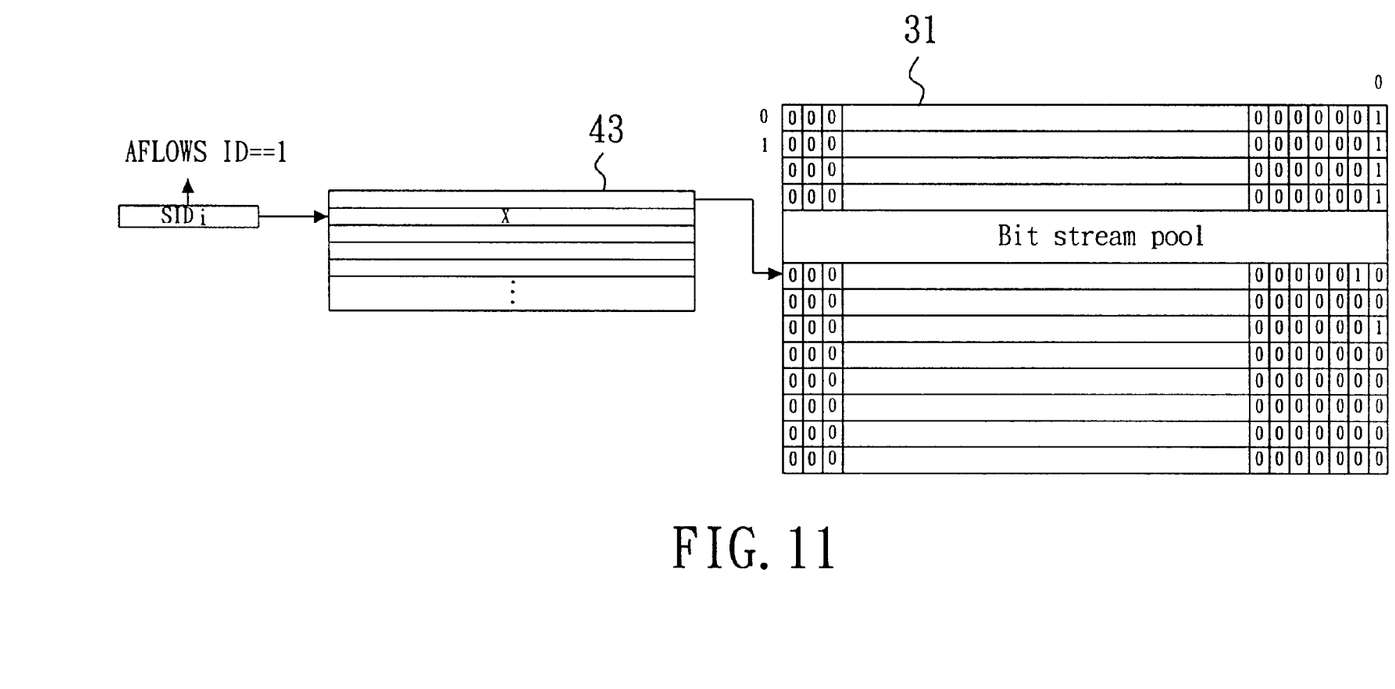
FIG. 11 is a schematic view showing the management of the specific IDs when adding a new aggregated flow.

If the specific ID of the new added Aflow is non-overlapping, as shown in the FIG. 11, and the Aflow ID of this new added Aflow is 1, an unused bit stream is found directly from the bit stream pool 31, which is assumed to have an index of x and is assigned to the symbol of the SIDi. The Aflow ID of the new added Aflow is recorded to the bit stream having an index of x.

Figure 12:
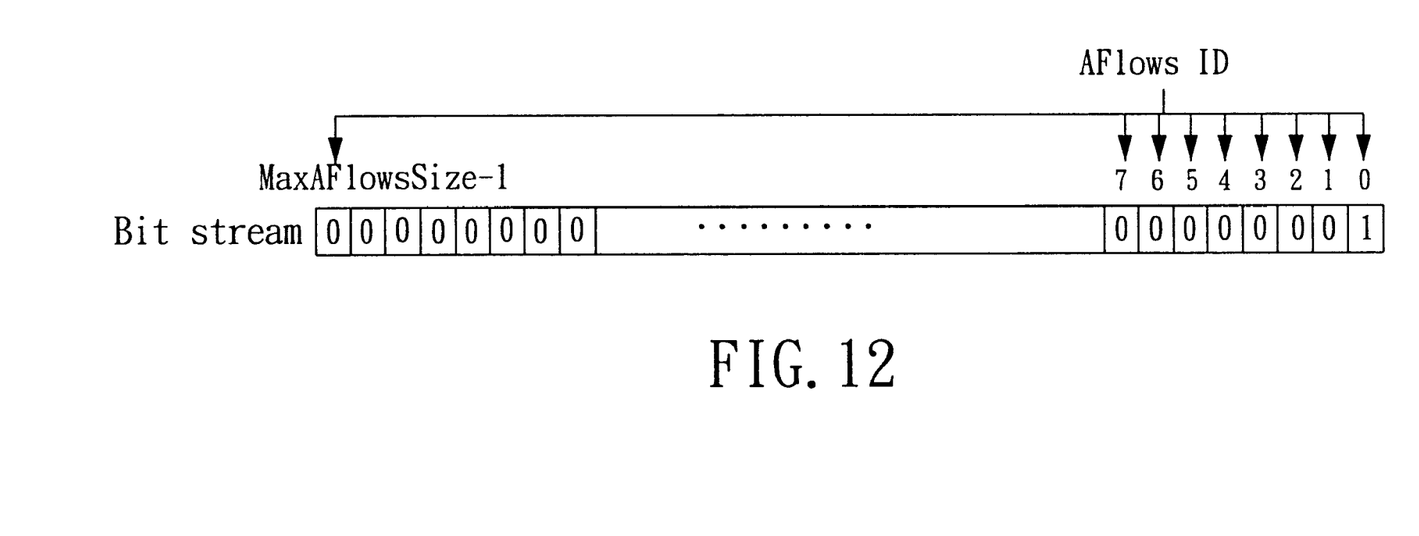
FIG. 12 is a schematic view showing the management of Aflow IDs when adding a new aggregated flow.
Figure 13:
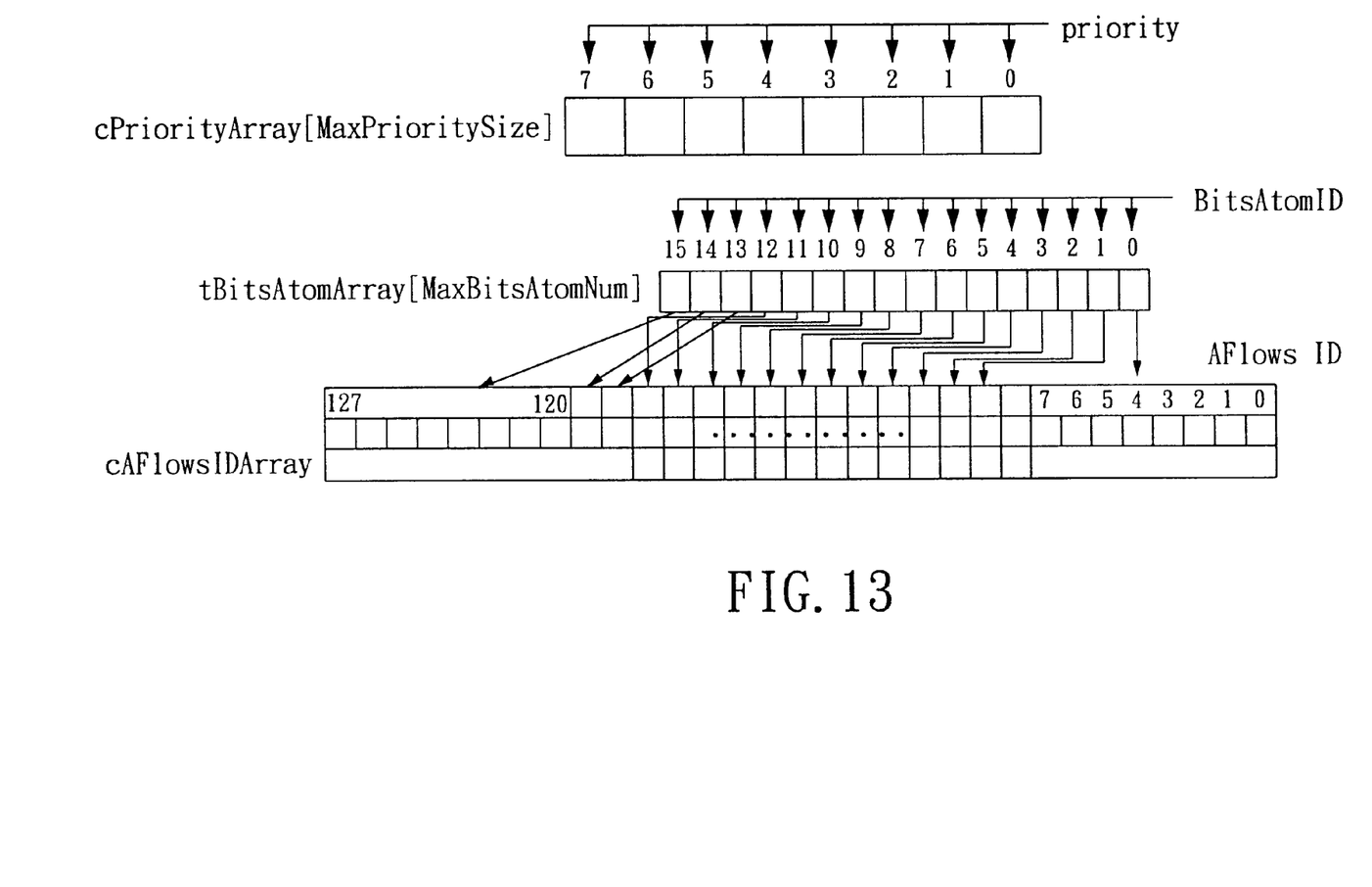
FIG. 13 is a schematic view showing the management of Aflow IDs when adding a new aggregated flow.

For the management of Aflow ID, referring to FIG. 12, since the position of each bit in the bit stream of the bit stream pool 31 represents the Aflow ID of an Aflow. Therefore, the domain of the Aflow ID is from 0 to the maximum number of Aflow minus 1 (0~MaxAFlowSize-1). Each Aflow ID can be given a priority having a value of 0~MaxPrioritySize-1. Furthermore, it is defined that the bitsatom is an inseparable unit for managing Aflow ID. All Aflow IDs at the same bitsatom has the same priority. Therefore, referring to FIG. 13, a cPriorityArray [MaxPrioritySize] is utilized to store bitsatom ID (this cPriorityArray has an index of priority), and a tBitsAtomArray[MaxBitsAtomNum] is utilized to manage bitsatom (this tBitsAtomArray has an index of bitsatom ID). Each bitsatom is corresponding to eight Aflow IDs. All bitsatoms are corresponding to a cAFlowsIDArray°

Figure 14:
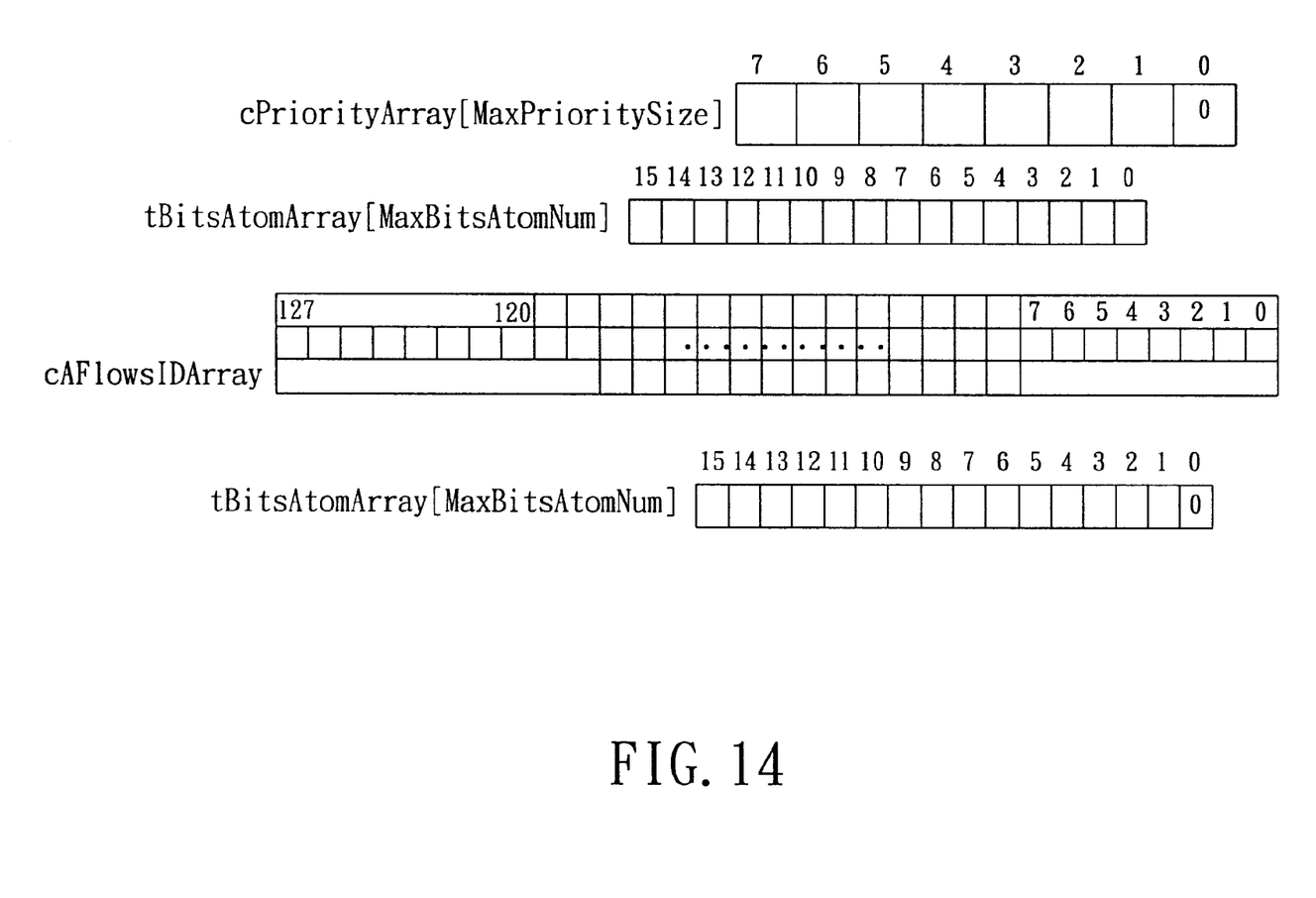
FIG. 14 shows one embodiment showing the management of aggregated flows ID when adding a new aggregated flow.

For example, it is assumed that the first new added Aflow is:
  Priority is equal to 0,
  Destination MAC address is a Wildcard,
  Source MAC address is a Wildcard,
  TOS/DSCP is a Wildcard,
  Protocol is a Wildcard,
  Source IP is a Wildcard,
  Destination IP is a Wildcard,
  Source Port is a Wildcard, and
  Destination Port is a Wildcard.
The second Aflow is:
  Priority is 1,
  Destination MAC address is a Wildcard,
  Source MAC address is a Wildcard,
  TOS/DSCP is a Wildcard,
  Protocol is a TCP,
  Source IP is a Wildcard,
  Destination IP is a Wildcard,
  Source Port is a Wildcard, and
  Destination Port is a Wildcard.
For dispatching Aflow ID to the first new added Aflow, referring to FIG. 14, there is no bitsatom in the index of prioriry 0 of the cPriorityArray. Therefore, at first, an unused bitsatom is found in the tBitsAtomArray, and it is assumed that a bitsatom 0 is found. Then, a 0 is recorded at the position with an index of 0 of the cPriorityArray; i.e., all the ID0 to ID7 of the cAFlowIDArray are distributed to the cPriorityArray with an index of 0. In the position 0 to 7 of the cAFlowsIDArray, an unused Aflow ID is found, which is assumed to be 0. Then, tBitsAtomPointer[ ] is updated.

Figure 15:
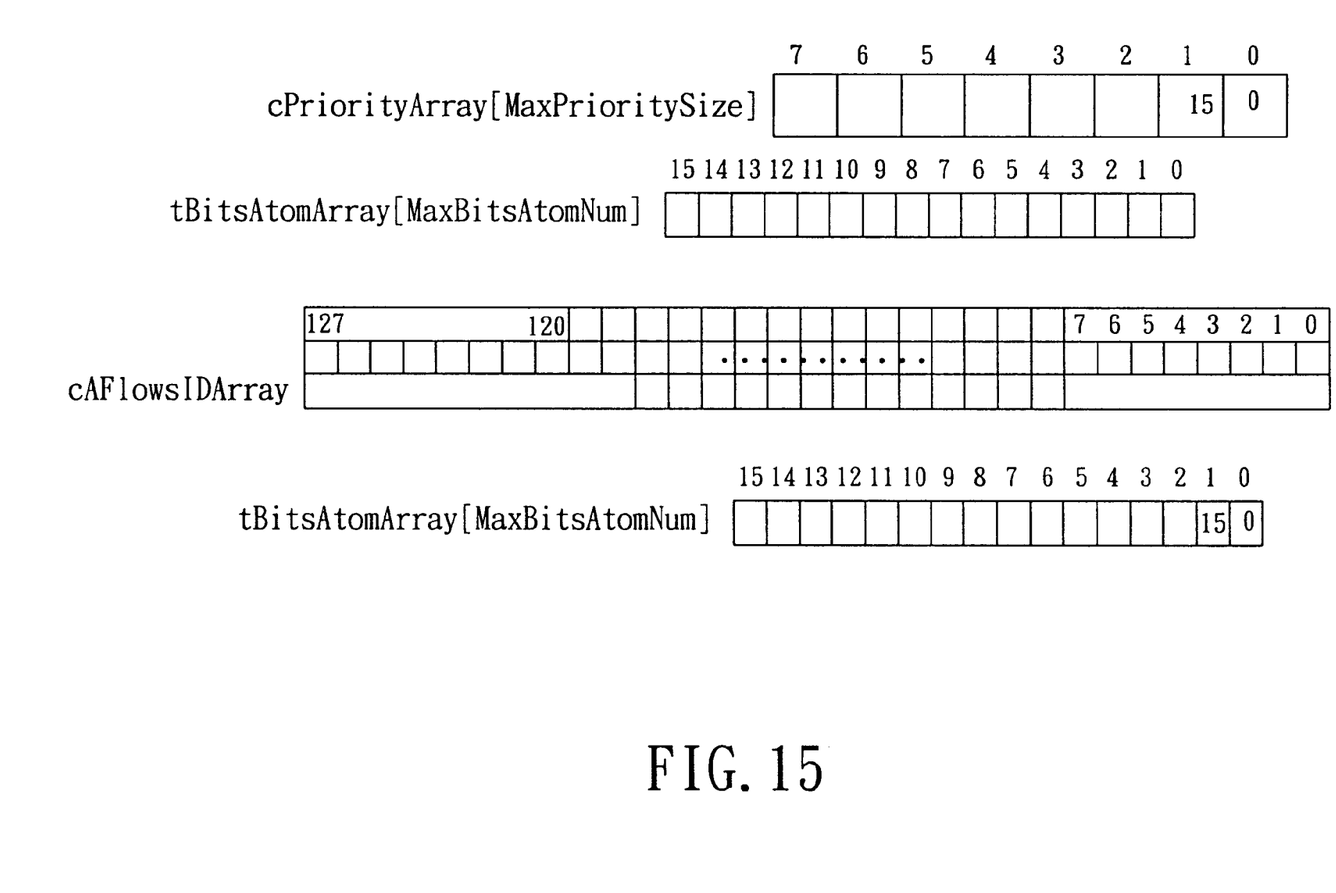
FIG. 15 shows one embodiment showing the management of aggregated flows ID when adding a new aggregated flow.

To distribute Aflow ID to the second new added Aflow, referring to FIG. 15, there is no bitsatom existed in the index of the cPriorityArray with a priority of 1. Therefore, an unused bitsatom is firstly found in tBitsAtomArray. It is assumed that bitsatom15 is found, and thus a 15 is recorded at the positions of the cPriorityArray with an index of 1. That is, all the IDs 120~127 of the cAFlowsIDArray are distributed to the cPriorityArray with an index of 1. An unused Aflow ID is found in positions 127~120 of the cAFlowsIDArray, for example 120, and the tBitsAtomPointer[ ] is updated. Thereby, the Aflow ID=0 and Aflow ID=120 can be dispatched to the first and second new added Aflow.

The existed Aflow can be removed, if the classification is undesired. It is assumed that an Aflow to be removed is:
  Destination MAC address is a Wildcard,
  Source MAC address is a Wildcard,
  TOS/DSCP is a Wildcard,
  Protocol is a Wildcard,
  Source IP is 140.92.61.93 or 140.92.62.151 or 140.92.63.10-100,
  Destination IP is except x.x.x.55,
  Source Port is a Wildcard, and
  Destination Port is a Wildcard.
Moreover, it is assumed that the Aflow ID of the Aflow is 0. To remove this Aflow, for all fields of the Aflow, the bits at the positions (0) of the Aflow ID of the bit stream are set to 0. For those source IP field which is not a wildcard, it has three symbols and corresponding specific IDs, as illustrated in the following:
  The specific ID of symbol 40.92.61.93 is 0;
  The specific ID of symbol 140.92.62.151 is 1; and
  The specific ID of symbol 140.92.63.10-100 is 2.
By the specific ID of each symbol, the bit stream is checked for determining whether only one Aflow is related to the symbol. If yes, the data of the field in the two dimensional transpose array 41 is updated, and the ID is recycled and the related Aflow is removed. Otherwise, only related Aflow is removed. Therefore, the object of removing Aflow is achieved.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A flexible and high-speed network packet classifying method, comprising the steps of:

(A) defining a plurality of aggregated flows (Aflows), each corresponding to an Aflow ID and described by symbols in fields of headers of a plurality of network packets, wherein a symbol is defined as a description of each field, and each symbol corresponds to a specific ID;

(B) extracting tokens of the fields of the headers of the plurality of network packets, wherein a token represents an actual value of a field and if the field has only byte, the token of the field is directly converted into an index for accessing a corresponding bit stream from the bit stream pool;

(C) indexing a bit stream pool of a memory responsive to the token of the field by using a two-stage index manager, wherein the bit stream pool has a plurality of bit streams, each having a plurality of bits arranged serially, and each bit corresponds to an aggregated flow; and (D) performing a bits-AND operation for a plurality of bit streams obtained from the bit stream pool for classifying network packets, wherein for the bit steam acquired from each field, a bits-AND operation is performed to generate a result bits stream, and then a classification ID corresponding to the result bits stream is generated through a method distributing and classifying regulars IDs, and wherein for the field with a symbol of a new added Aflow not being a wildcard, the number of symbols and content of the byte are used as an index, and in the bit stream of the transpose array at a position of (the number of symbols, the content of the byte), a bit at a position corresponding to the specific ID of the symbol is set to 1.

2. The flexible and high-speed network packet classifying method as claimed in claim 1, wherein in step (B), if the field has more than one byte, the two-stage index manager performs an indexing operation through two stages in such a manner that, the content of each byte is converted into a bit stream through a corresponding item of a two dimensional array; all the bit streams of the field are bits-AND-ed to generate a result bit stream from which a specific ID of this field is generated; and by using the specific ID as an index, an index of this field in the bit stream is found from a table stored with bit stream pool index values.

3. The flexible and high-speed network packet classifying method as claimed in claim 1, wherein in the second stage, the corresponding bit stream is acquired from the bit stream pool based on the index of the field.

4. The flexible and high-speed network packet classifying method as claimed in claim 1, wherein in step (A), if an Aflow ID of a new Aflow is defined as n, for a field of the aggregated flow with a symbol being a wildcard, a bit of position n of a corresponding bit stream in the bit stream pool is set to 1.

5. A flexible and high-speed network packet classifying method comprising the steps of:

(A) defining a plurality of aggregated flows (Aflows), each corresponding to an Aflow ID and described by symbols in fields of headers of a plurality of network packets, wherein a symbol is defined as a description of each field, each symbol corresponds to a specific ID, and wherein, for a new added aflow, if the range of the new added Aflow is overlapped with existing Aflow, the range of the new added Aflow is separated into overlapping and non-overlapping subsections, each being assigned with an overlapping or non-overlapping specific ID;

(B) extracting tokens of the fields of the headers of the plurality of network packets, wherein a token represents an actual value of a field;

(C) indexing a bit stream pool of a memory responsive to the token of the field by using a two-stage index manager, wherein the bit stream pool has a plurality of bit streams, each having a plurality of bits arranged serially, and each bit corresponds to an aggregated flow; and (D) performing a bits-AND operation for a plurality of bit streams obtained from the bit stream pool for classifying network packets.

6. The flexible and high-speed network packet classifying method as claimed in claim 5, wherein for the specific ID of the overlapping part, the specific ID of the new added Aflow is larger than the specific ID of the existing Aflow.

7. The flexible and high-speed network packet classifying method as claimed in claim 6, wherein the specific ID of the new added Aflow is SIDi, and if it is overlapped with SIDj, SIDj is the maximum specific ID whose range contains the range of SIDi.

8. A flexible and high-speed network packet classifying method comprising the steps of:

(A) defining a plurality of aggregated flows (Aflows), each corresponding to an Aflow ID and described by symbols in fields of headers of a plurality of network packets, wherein a symbol is defined as a description of each field, each symbol corresponds to a specific ID;

(B) extracting tokens of the fields of the headers of the plurality of network packets, wherein a token represents an actual value of a field;

(C) indexing a bit stream pool of a memory responsive to the token of the field by using a two-stage index manager, wherein the bit stream pool has a plurality of bit streams, each having a plurality of bits arranged serially, and each bit corresponds to an aggregated flow;

(D) performing a bits-AND operation for a plurality of bit streams obtained from the bit stream pool for classifying network packets; and (E) removing un-required aggregated flows.

9. The flexible and high-speed network packet classifying method as claimed in claim 8, wherein if an aggregated flow is to be removed, for the wildcard field of the aggregated flow, bits at positions of Aflow ID corresponding to the aggregated flow are set to 0.

10. The flexible and high-speed network packet classifying method as claimed in claim 9, wherein for non-wildcard fields, by a specific ID of each symbol, the bit stream is checked for determining whether only one Aflow is related to the symbol, and if yes, data of the field in the two dimensional transpose array is updated, otherwise, only related aggregated flow is removed.

* * * * *